United States Patent Office 2,874,140
Patented Feb. 17, 1959

2,874,140

MOLDING COMPOSITION COMPRISING POLY-
VINYL CHLORIDE OR POLYETHYLENE AND
A METAL OXIDE

Harry Kloepfer, Frankfurt am Main, Germany, assignor to Deutsche Gold- und Silber-Scheideanstalt vormals Roessler, Frankfurt am Main, Germany No Drawing. Application May 20, 1955, Serial No. 510,011. In Germany December 31, 1948

Public Law 619, August 23, 1954
Patent expires December 31, 1968

3 Claims. (Cl. 260—41)

The present invention relates to improvements in the production of moulded bodies, consisting wholly or in part of natural or synthetic rubber or rubber-like or synthetic resin-like substances or mixtures thereof together with finely divided oxides.

According to the invention it has been found that the properties of the moulded bodies can be considerably improved in various respects, for example with regard to hardness, elasticity, extension, abrasion-resistance, impact resistance and the like by making use of highly dispersed oxides of metal or metalloids which have been produced by the thermal decomposition of volatile compounds of metals or metalloids in the vapour state by means of oxidising or hydrolysing agents, if desired in the presence of a gaseous or vaporous diluent or of combustible gases.

Accordingly the present invention provides a process for the production of moulded bodies consisting wholly or partially of natural or synthetic rubber or of rubber-like or synthetic resin-like substances or mixtures thereof together with finely divided oxides, including the step of incorporating with the materials to be moulded oxides which have been produced by the thermal decomposition of volatile compounds of metals or metalloids in the vapour state by means of oxidising or hydrolysing agents, if desired in the presence of a gaseous or vaporous diluent or of combustible gases.

The present invention also provides a moulding composition and moulded products comprising natural or synthetic rubber or rubber-like or synthetic resin-like substances or mixtures thereof, together with finely divided oxides which have been produced by thermal decomposition of volatile compounds of metals or metalloids in the vapour state by means of oxidising or hydrolysing agents, if desired in the presence of a gaseous or vaporous diluent or combustible gases. The term high molecular weight polymeric material is used hereinafter to mean the above-mentioned natural or synthetic rubber or rubber-like materials or synthetic resin-like substances or mixtures thereof.

Suitable compounds of metals or metalloids from which highly dispersed oxides may be produced include for example ferric chloride, aluminum chloride, titanium tetrachloride, beryllium chloride, beryllium acetate, chromyl chloride, vanadyl chloride or especially silicon tetrachloride. These compounds are hydrolysed in the vapour state together with the necessary quantity of water vapour and/or oxygen to the respective hydroxides or oxides. Alternatively iron pentacarbonyl, nickel carbonyl, zinc dimethyl, magnesium dimethyl and the like may be reacted with oxygen or air, if desired at moderately raised temperatures, whereby the respective metal oxides are formed in colloidal dispersion.

The hydrolyses or oxidations described can advantageously be carried out in the presence of a further gaseous or vaporous diluent, such for example as nitrogen, carbon dioxide, hydrogen and the like, whereby the respective metal oxides are obtained as a particularly fine dispersion, for example as aerosols which are collected as aerogels.

Working in the presence of large quantities of these diluents has the advantage that an undesired increase in particle size is prevented and moreover undesired rises in temperature (for example oxidation) can be rendered innocuous.

The essential factor in the production of the oxides employed according to the invention is that they are produced in a vapour phase reaction in which a volatilised metal or metalloid compound is reacted to form an oxide aerosol which agglomerates to form an aerogel, usually upon cooling, which is then collected by cyclones, filters or upon cooled moving surfaces, preferably, however, at a temperature above the dew point of the easily condensable by-products of the reaction, such as, hydrochloric acid and water vapour. Preferably, the volatile compounds from which the highly dispersed oxides are produced are the halides of, such as, for example, silicon tetrachloride, aluminum chloride, titanium tetrachloride and the like. Such volatile halides can, for example be introduced into a flame in the presence of air or other oxygen containing gas and if desired in the presence of a combustible gas containing free or combined hydrogen, for example, hydrogen, hydrocarbon gases and illuminating gas. It is not essential to employ a flame for the reaction. For example, the volatile compounds, such as, silicon tetrachloride, titanium tetrachloride or aluminum chloride, can be reacted in the vapour phase with water vapour and/or air at an elevated temperature, for example 250 to 300° C., to give the desired highly dispersed oxides.

The oxide aerogels employed according to the invention have an exceedingly fine elementary particle size, for example, below $0.05\mu$ and preferably below $0.01\mu$. These elementary particles are weakly agglomerated in the aerogels and are redispersed upon thorough mixing with the high molecular weight polymeric materials.

The finely divided aerogels can be employed in the production of moulded bodies which consist wholly or partially of natural or synthetic rubber or rubber-like substances such as polymerised products of butadiene, chlorobutadiene or mixtures thereof. By the addition of these aerogels, abrasion-resistance, impact-resistance and the like are increased considerably.

According to the invention moulded bodies can also be produced by mixing the said aerogels with synthetic resins, such for example as polyisobutylene, co-polymers thereof with vinyl acetate and the like or polymeric vinyl, acryl compounds, vinyl acetate, vinyl-chloride, styrene, or acrylic acid esters, polyethylene, polyamide resins and polyester resins. The said synthetic resins can be subjected to polymerisation before or after addition of the said colloidal metal oxides. It is frequently advantageous to incorporate the active filler with the aid of rollers, if desired friction rollers. Alternatively the polymerised compounds, for example, polymethacrylic acid esters mixed with monomeric methacrylic acid esters can be mixed with polymerisation catalysts, such for example as benzoyl peroxide, and the aerogels, and the polymerisation can then be completed. Instead of using catalysts, polymerisation can also be effected in manner known per se by irradiation with short wave-length light.

By using synthetic resin-like substances or substances which give synthetic resin-like masses, moulded bodies are obtained which are distinguished by particularly great hardness, impact-resistance and the like. The present invention can be applied with advantage to the production of synthetic resin teeth, prostheses and other dental aids. Since the strengthening action is very strong even with small additions it is possible according to the present invention to produce bodies of a transparency which is only slightly reduced.

It is already known to add finely divided or colloidal metal oxides to synthetic resin masses of the phenol-formaldehyde type, such as those sold under the registered trademark "Bakelite."

It was found, however, that particularly favourable results are only obtained when aerogels are used according to the present invention which are produced by thermal decomposition of volatile compounds of metals or metalloids in the vapour state by means of oxidising or hydrolysing agents, if desired in the presence of a gaseous or vaporous diluent or combustible gases. This can be seen from the following comparative experiments:

A mixture of 3 parts of pulverulent polymethacrylic acid methyl ester and 1 part of monomeric methacrylic acid methyl ester was mixed with 0.01% by weight of fillers, and the polymerisation was completed by heating for half an hour to 100° C. The Brinell hardness of a moulded body thus obtained was determined with a 5 mm. ball, a pressure of 62.5 kgs. per square cm. and a pressure duration of 30 seconds. The same experiment was repeated with no fillers at all and the Brinell hardness was determined in the same way. In the latter case, i. e., without any fillers at all, a Brinell hardness of 13.3 was found. When using finely divided colloidal silica, which had been obtained by hydrolysing silicon tetrachloride with liquid water, a Brinell hardness of 14.4 was found, whilst on using a silica aerogel according to the invention a Brinell hardness of 18.0 was observed.

When the aerogels are used in the production of moulded bodies from natural or synthetic rubber or rubber-like substances or mixtures thereof the moulded bodies show excellent properties. Their properties are equal to and frequently exceed those of moulded bodies produced from rubber with the best American types of carbon black. The aerogels, which are obtained by thermal decomposition of vaporous metal or metalloid compounds in the vapour state, have even surpassed the excellent German carbon black in many respects, especially as regards elasticity, impact-resistance, fatigue and extension of the moulded bodies produced with the aid thereof.

The use of the fillers of the invention, especially of very finely divided silica produced in the aerosol condition and collected as the aerogel, which is colourless, makes it possible to produce with advantage tread mixtures for motor tires and bicycle tires which are transparent or coloured as desired. These tire mixtures with a very low degree of filling with particularly finely divided aerogels, are not only equal to mixtures filled with highly active gas carbon black but surpass the latter as regards tensile strength and impact-resistance. Tires produced with such aerogels have the advantage, that, because of their low modulus value and related elasticity, they not only have better running properties as regards anti-skid action, braking power and the like, but also exhibit a much smaller evolution of heat and therefore have a greater resistance to wear than conventional tires produced with carbon black. In the same way considerable advantages are obtained in many uses of natural and synthetic rubber, for example for the production of rubber shoe soles and objects of all kinds.

If desired the aerogels can be employed in combination with other fillers, known per se, such for example as carbon black, aluminum oxide and the like.

It is already known to use as rubber fillers oxides of metals such as are produced by the reaction of volatile metals with oxidising agents in the vapour state. The present invention however is concerned with filling rubber or rubber-like material with aerogels produced by decomposition of volatile metal or metalloid compounds. The known preparations made by vaporising and then oxidising metals have a particle size which lies in part above 1 micron and can therefore not be used at all as fillers for rubber or rubber-like substances within the scope of the present invention. If they are so used, the results are at any rate much worse than those obtained with the oxides to be used according to the present invention which have been produced from volatile metal or metalloid compounds and which have an elementary particle size ranging for example from 0.01 micron down to 0.005 micron. The smaller the particle size, down to a certain value, the better is the activity of the fillers.

The quantity of aerogels to be added according to the invention can be varied within wide limits. The aerogels can be incorporated during the production of rubber or rubber-like moulded bodies in the same way as is usual when incorporating active carbon black. As the oxides employed according to the invention have a higher activity, a considerable smaller quantity of the fillers may be used for natural or synthetic rubber or rubber-like substances than with carbon black used as the filler. In many cases 20 parts of the aerogel per 100 parts of rubber are sufficient. The filler can be incorporated in the usual way with addition of known assistants, such for example as sulphur accelerators, zinc oxide and stearic acid. The incorporation can be carried out according to the process generally usual for tread mixtures containing carbon black. In many cases, for example when using silicon dioxide aerogel, it has proved advantageous to make the proportion of accelerators and sulphur somewhat higher than is usual when using carbon black mixtures.

The quantity of aerogels to be incorporated with the synthetic resin like masses can likewise be varied within wide limits. In general additions of less than 20% of the total mass are sufficient; in many cases it is desirable to make the additions considerably smaller, for example 5 to 1% or lower.

*Example 1*

The effect of a silica according to the invention which is incorporated in natural rubber was determined by an examination of the mechanical properties of a vulcanized mixture, filled (a) with 50 parts by weight of silica and (b) with 50 parts by weight of carbon black. The rubber mixtures had the following composition:

|  | (a) | (b) |
| --- | --- | --- |
| Smoked sheets | 100 | 100 |
| silica | 50 | |
| carbon black | | 50 |
| zinc oxide | 5 | 5 |
| PBN (phenyl beta naphthol) | .1 | 1 |
| pinetar | 6 | 6 |
| accelerator | 3.4 | 0.8 |
| sulfur | 5.0 | 2.5 |

The determination of the mechanical properties of the vulcanizates (cure time 40 min.) yielded for the various mixtures the following values:

| Mixture | Tensile strength, kg./cm. | Modulus 300, kg./cm. | Elongation at break, percent | Tear res. from a nick, kg./cm. | Shore hardness | Abrasion, mm.³ |
| --- | --- | --- | --- | --- | --- | --- |
| (a) | 265 | 49 | 700 | 42 | 69 | 138 |
| (b) | 265 | 93 | 580 | 34 | 63 | 98 |

*Example 2*

The effect of oxide aerogels according to the invention was determined also in a synthetic rubber 60:40 poly-isobutyl styrene co-polymer ("Polysar Butyl 300") whereby the following mixtures were employed, filled with silica (a) and with carbon black (b):

|  | (a) | (b) |
|---|---|---|
| Polysar Butyl 300 | 100 | 100 |
| silica | 50 |  |
| carbon black |  | 50 |
| paraffin oil | 2 | 2 |
| zinc oxide | 5 | 5 |
| Stearic acid | 3 | 3 |
| accelerator | 2.9 | 1.2 |
| Sulfur | 3.0 | 2.0 |

The determination of the mechanical properties after a cure time of 50 min. yielded the following values:

| Mixture | Tensile strength, kg./cm. | tear resistance from a nick, kg./cm. | Shore hardness |
|---|---|---|---|
| (a) | 160 | 28 | 74 |
| (b) | 179 | 23.6 | 65 |

Example 3

The test was carried out with a mixed polymerisate of butadiene acrylonitrile (trade name Perbunan W) which was subjected to the effect of silica (mixture a) and carbon black (mixture b). The mixtures had the following composition:

|  | (a) | (b) |
|---|---|---|
| Perbunan W | 100 | 100 |
| silica | 50 |  |
| carbon black |  | 50 |
| stearic acid | 0.5 | 0.5 |
| zinc oxide | 3 | 3 |
| dibenzyl ether | 5 | 5 |
| accelerator | 2.8 | 1.0 |
| sulfur | 3 | 1.5 |

The determination of the mechanical properties yielded the following values:

| Mixture | tensile strength, kg./cm. | modulus 300, kg./cm. | tear resistance from a nick, kg./cm. | Shore hardness |
|---|---|---|---|---|
| (a) | 295 | 152 | 18 | 81 |
| (b) | 238 | 112 | 13 | 68 |

Example 4

Similar to the foregoing example a cold rubber (trade name Polysar Krylene, a 60:40 butadiene-styrene copolymer) was filled with the following mixtures:

|  | (a) | (b) |
|---|---|---|
| Polysar Krylene | 100 | 100 |
| silica | 50 |  |
| carbon black |  | 50 |
| stearic acid | 2 | 2 |
| cumaron resin | 7.5 | 7.5 |
| gylcol | 4 | 4 |
| zinc oxide | 5 | 5 |
| accelerator | 5 | 1 |
| sulfur | 3 | 2.4 |

The determination of the mechanical properties yielded the following values:

| Mixture | tensile strength, kg./cm. | modulus 300, kg./cm. | tear resistance from a nick, kg./cm. | Shore hardness |
|---|---|---|---|---|
| (a) | 190 | 72 | 14 | 78 |
| (b) | 260 | 134 | 12 | 64 |

Example 5

This example serves as a comparative test between a mixture which is normally filled with carbon black (a) and a mixture whereby the carbon black is partly substituted by a silica according to the invention (b). The mixtures had the following composition:

|  | (a) | (b) |
|---|---|---|
| Smoked Sheets | 100 | 100 |
| carbon black | 45 | 30 |
| silica |  | 15 |
| stearic acid | 2 | 2 |
| zinc oxide | 5 | 5 |
| PBN (Phenyl beta naphthol) | 1 | 1 |
| pinetar | 4 | 4 |
| accelerator | 0.6 | 1.6 |
| sulfur | 2.5 | 2.5 |

The determination of the mechanical properties of the vulcanizates (varying time of cure at a temperature of 140° C.) yielded the following values:

| Mixture | Time of cure, min. | Strength, kg./cm.² | Elong. at break, percent | Mod. 300, kg./cm.² | Elasticity, percent | Shore hardness | Tear resist. from a nick, kg./cm. | Abrasion (DVM), mm.³ |
|---|---|---|---|---|---|---|---|---|
| (a) | 20 | 269 | 606 | 90 | 41 | 60 | 33.8 |  |
|  | 40 | 287 | 582 | 110 | 43 | 64 | 28.0 | 117 |
|  | 60 | 282 | 570 | 113 | 41 | 65 | 24.2 | 121 |
|  | 80 | 271 | 557 | 111 | 40 | 65 | 26.5 |  |
|  | 100 | 285 | 570 | 114 | 40 | 64 | 19.7 |  |
| (b) | 20 | 297 | 631 | 90 | 47 | 59 | 32.5 |  |
|  | 40 | 300 | 619 | 95 | 46 | 60 | 26.5 | 90 |
|  | 60 | 288 | 611 | 90 | 47 | 59 | 24.5 | 84 |
|  | 80 | 281 | 604 | 88 | 46 | 59 | 23.8 |  |
|  | 100 | 285 | 624 | 82 | 45 | 59 | 26.1 |  |

Example 6

The example shows the influence of silica and titanium dioxide respectively, both substances pyrogenically produced as aerogels, when used as filling agents in polyvinylchloride. As a softening agent dioctyl phthalate is simultaneously incorporated in varying quantities together with the aforementioned oxides. Mixtures with various contents of softening agents and an addition of 20 parts by weight of silica or titanium dioxide respectively, yielded the following values:

| Mixture | | | | Tensile strength, kg./cm. | Elongation at break, percent | Tear Resistance, kg./cm. | Shore hardness |
|---|---|---|---|---|---|---|---|
| PVC | softening agent | SiO₂ | TiO₂ | | | | |
| 50 | 50 |  |  | 67 | 473 | 16.3 | 60 |
| 50 | 50 | 20 |  | 97 | 340 | 33.8 | 85 |
| 80 | 20 |  |  | 253 | 234 | 143 |  |
| 80 | 20 | 20 |  | 373 | 155 | 237 |  |
| 80 | 20 |  | 20 | 321 | 75 | 223 |  |

The data show that the fillers according to the invention are clearly superior to other filling agents as, for instance, such essential properties of the polyvinylchloride as, for instance, the tensile strength and above all the tear resistance is highly improved.

Should special properties, for instance, a Shore hardness of 95 be obtained in these mixtures, the content of the softening agent may be increased in the mixture without impairing the tensile strength, if the pyrogenically produced oxides according to the invention are simultaneously used as fillers as shown in the comparative test below. In order to obtain a Shore hardness of 95 the following mixtures are needed:

| Mixture | tensile strength | elongation at break |
|---|---|---|
| 75 PVC, 25 softening agent | 225 | 225 |
| or |  |  |
| 65 PVC, 35 softening agent and 20% SiO₂ | 220 | 320 |

Example 7

This example shows that the softening point of polyethylene may considerably be increased by adding a pyrogenically produced silica. Such mixtures can be worked up to smooth foils at elevated roller temperatures. The addition of SiO$_2$ to polyethylene (melting point 115° C.) in a ratio of 10:4 results in a rise of the working temperature up to 130° C.; with a ratio of 10:6 the working temperature rises up to 160° C., whilst with a ratio of 10:8 the temperature is increased up to 170° C.

Example 8

In foils made of polyethylene (strength 0.5 mm.) the tensile strength at break and the elongation were determined. To several mixtures polyisobutylene was also added. The determination yielded the following values whereby the first figure represents the tensile strength at break or the elongation respectively in the longitudinal direction, i. e. in the roller direction, whilst the second figure represents the tensile strength at break or elongation in cross-direction to the roller.

| Mixture | | | Tensile strength, kg./mm.² | Elongation, percent |
|---|---|---|---|---|
| polyethylene | polyisobutylene | silicium dioxide | | |
| 100 | --- | 40 | 127/121 | 10/10 |
| 100 | 10 | 60 | 160/147 | 100/50 |
| 100 | 20 | 80 | 145/146 | 100/100 |
| 100 | 30 | 80 | 150/140 | 80/100 |

I claim:

1. A moulding composition comprising a high molecular weight polymeric material selected from the group consisting of polyvinyl chloride and polyethylene having dispersed therein up to and including 20% by weight of a finely divided solid oxide having a particle size of less than 50 mµ selected from the group consisting of silica, aluminum oxide and titanium dioxide produced by the vapor phase decomposition of a corresponding volatile compound by an agent selected from the group consisting of oxygen and water vapor.

2. A moulding composition comprising polyethylene having dispersed therein up to and including 20% by weight of a finely divided solid oxide having a particle size of less than 50 mµ selected from the group consisting of silica, aluminum oxide and titanium dioxide produced by the vapor phase decomposition of a corresponding volatile compound by an agent selected from the group consisting of oxygen and water vapor.

3. A moulding composition comprising polyvinyl chloride having dispersed therein up to and including 20% by weight of a finely divided solid oxide having a particle size of less than 50 mµ selected from the group consisting of silica, aluminum oxide and titanium dioxide produced by the vapor phase decomposition of a corresponding volatile compound by an agent selected from the group consisting of oxygen and water vapor.

References Cited in the file of this patent

UNITED STATES PATENTS

| 2,428,252 | Von Stroh | Sept. 30, 1947 |
| 2,453,052 | Van Etten | Nov. 2, 1948 |
| 2,578,605 | Sears et al. | Dec. 11, 1951 |